June 5, 1956     T. W. POTTER     2,748,584
MEANS FOR PREPARING AND PROPORTIONALLY ADDING
NEW WASTE TO RECLAIMED JOURNAL BOX WASTE
Filed Dec. 13, 1951     3 Sheets-Sheet 1
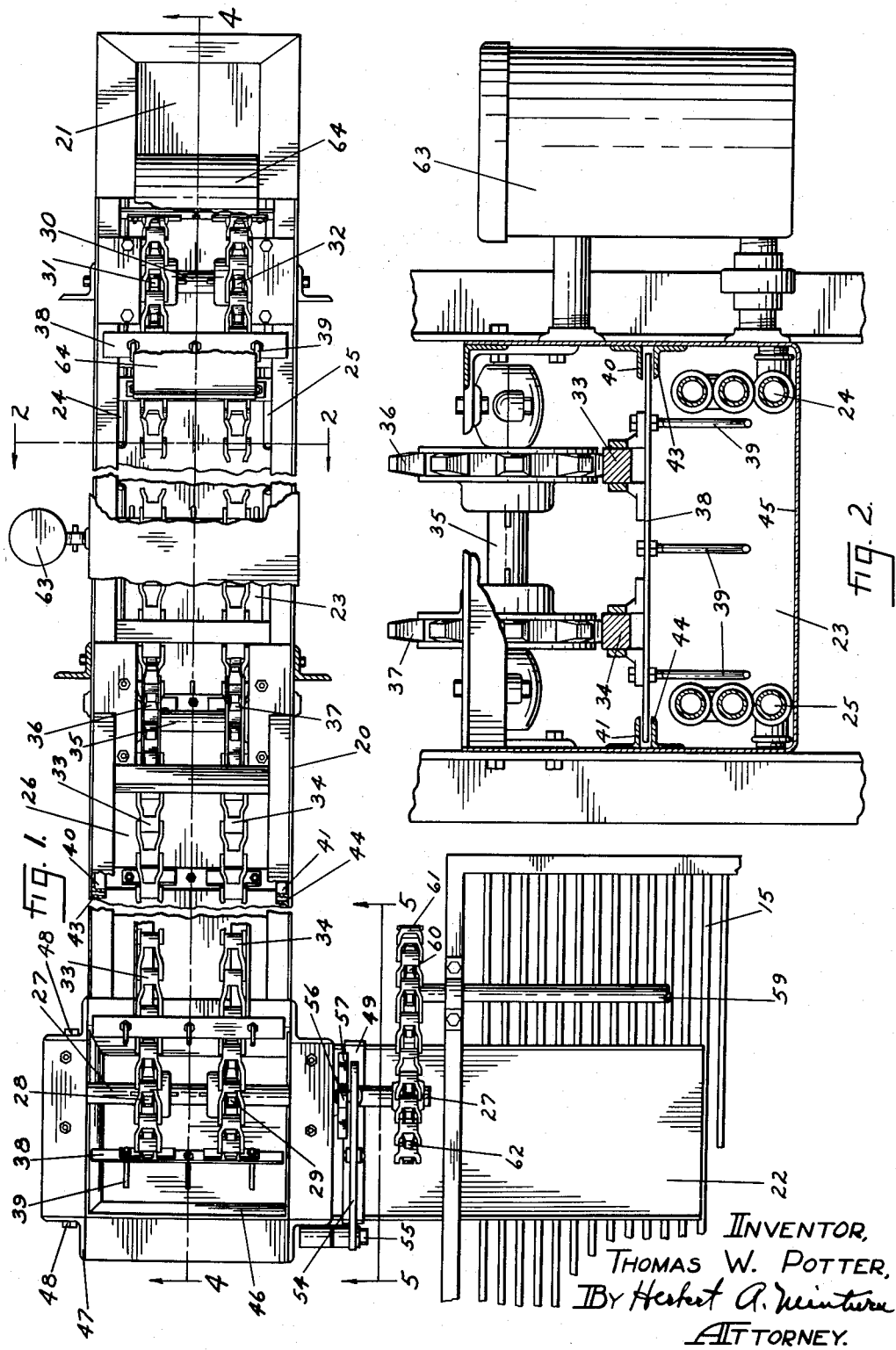
INVENTOR,
THOMAS W. POTTER,
By Herbert A. Minturn,
ATTORNEY.

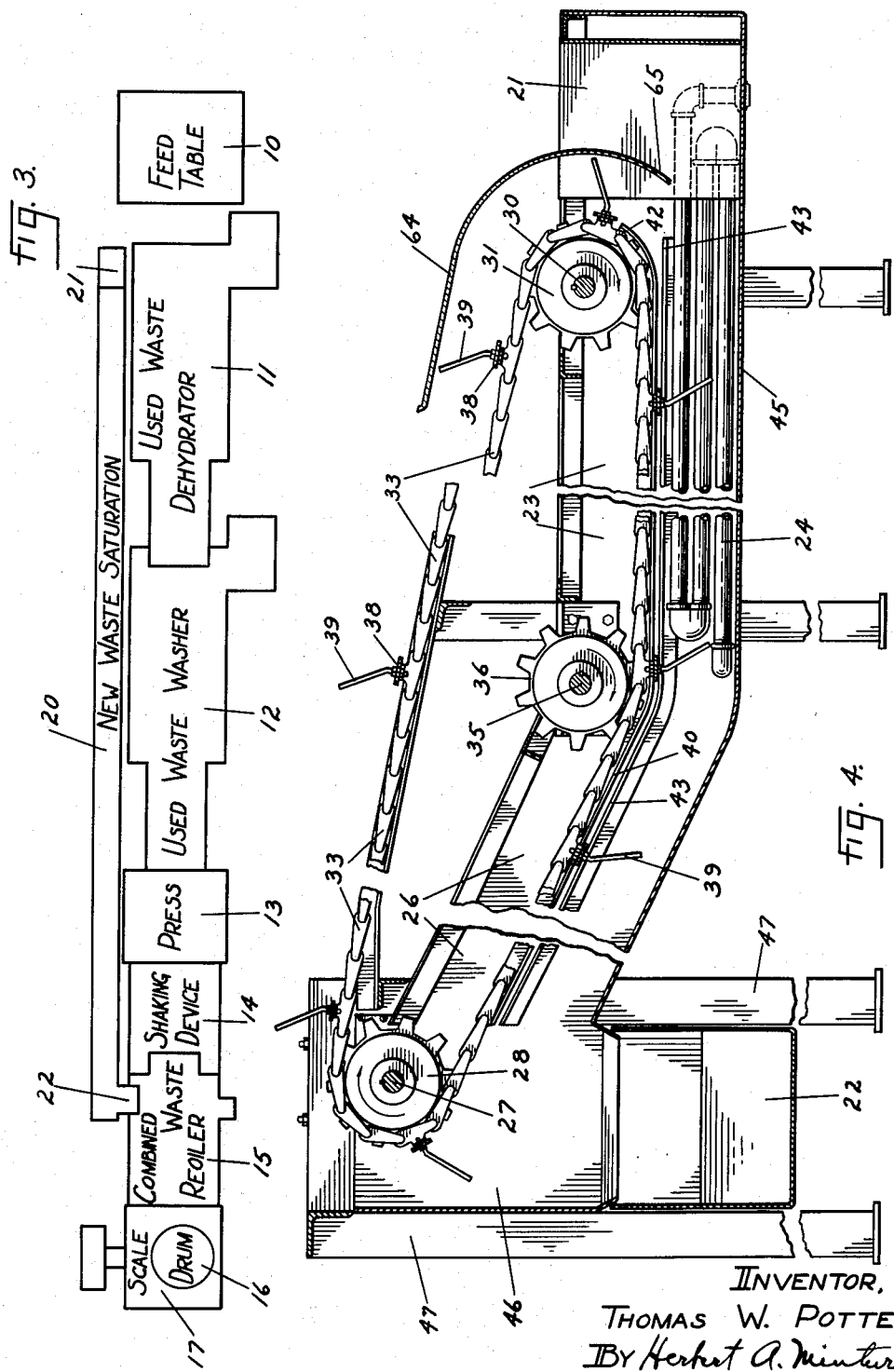

June 5, 1956     T. W. POTTER     2,748,584
MEANS FOR PREPARING AND PROPORTIONALLY ADDING
NEW WASTE TO RECLAIMED JOURNAL BOX WASTE
Filed Dec. 13, 1951     3 Sheets-Sheet 3
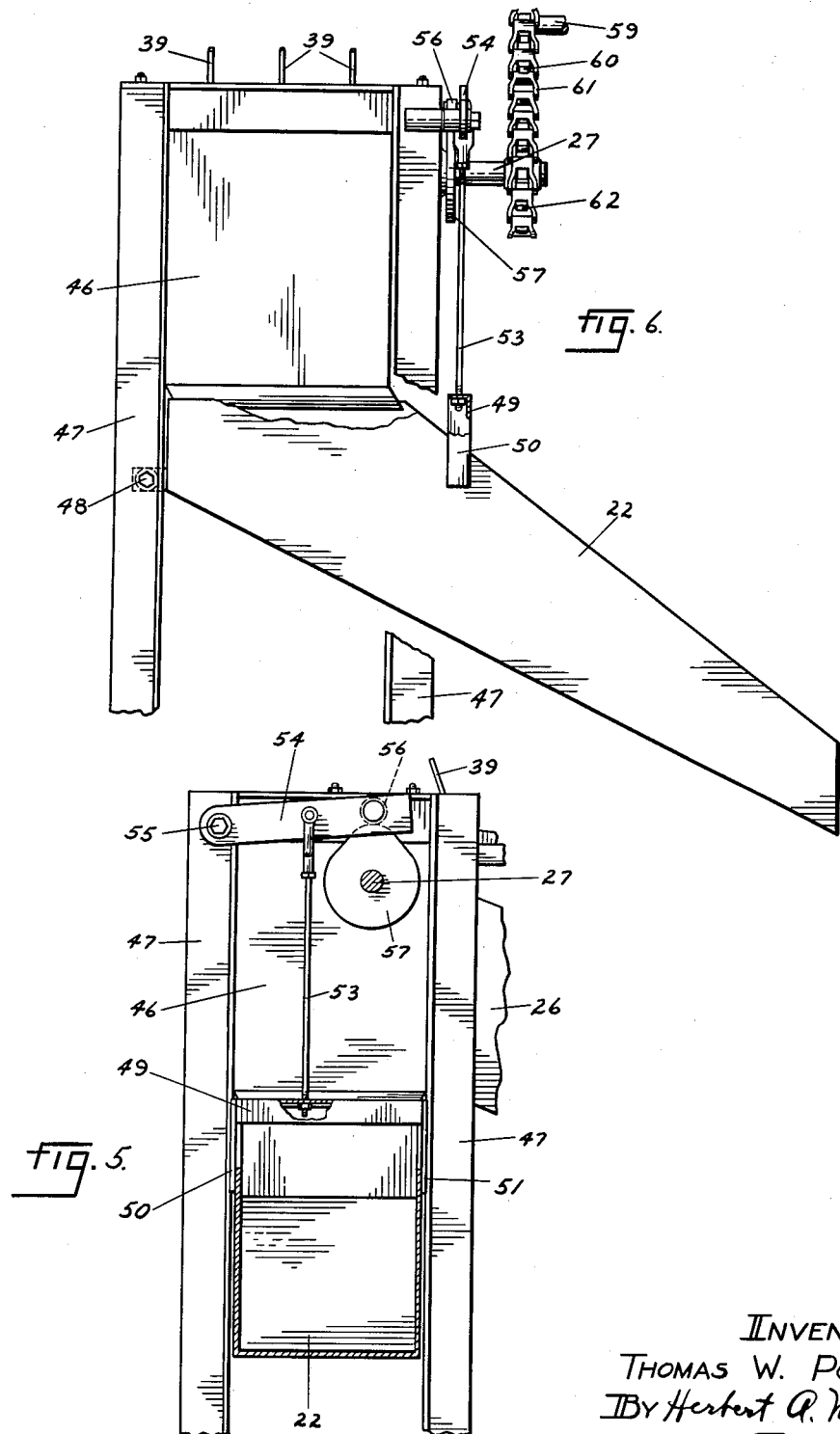
INVENTOR,
THOMAS W. POTTER,
BY Herbert A. Minturn,
ATTORNEY.

United States Patent Office 2,748,584
Patented June 5, 1956

2,748,584

MEANS FOR PREPARING AND PROPORTIONALLY ADDING NEW WASTE TO RECLAIMED JOURNAL BOX WASTE

Thomas W. Potter, Chicago, Ill., assignor to Journal Box Servicing Corporation, Indianapolis, Ind., a corporation of Indiana Application December 13, 1951, Serial No. 261,541

2 Claims. (Cl. 68—1)

This invention relates to a method and also to a device for carrying out the method of saturating new waste and adding it in a definite proportion to oil washed, reclaimed journal box waste.

Reference is made to prior patents showing apparatus for the washing in oil of the old, dirty waste taken from journal boxes of rolling stock on railroads. The class of patents referred to is that in which appear Patents Nos. 2,000,291 and 2,090,260.

In the prior art, as illustrated by these two specific patents, the dirty waste containing foreign materials and congealed oils is dumped into a hot bath of oil where it is pulled apart and swished back and forth in a bath of heated lubricating oil and some short ends of the waste and the heavy particles of the foreign material are screened out. The waste is advanced through this wash oil bath and is then carried to some sort of an extractor, such as the press shown in these two patents referred to, wherein the wash oil is removed from the waste and the waste is then transferred to a new tank of heated oil wherein the waste is resaturated with clean oil, and finally the waste is delivered with a definite oil content for reuse. This waste, thus reclaimed, is returned to the railroads for reuse in journal boxes.

In some instances, in order to make up for loss in volume from the originaly used waste, and also to provide sufficient resilience in the waste being returned for use in packing journal boxes, it is often desirable, and in fact is specified by some railroads, that a definite percentage of new waste go back into the reclaimed waste.

One of the great advantages of reclaiming used journal box waste is that the fibers of the waste are thoroughly impregnated with oil to a higher degree than is the case when new waste is initially used. It is not feasible nor desirable to add the dry new waste directly to the reclaimed waste without that new waste going through a process of oil saturation.

If the new waste is dumped into the initial washing tank of the waste to be reclaimed, then the new waste will serve as a very effective filter, permitting the oil to enter the waste, but causing the dirt in the oil coming from the old waste to be filtered out and deposited on the surfaces of the fiber, all to such an extent that the new waste is not in a condition for use. Neither is it feasible or desirable to dump the new waste directly into the reoiling tank of the reclaiming device because in that process, the waste will not be in that rinse oil long enough to become thoroughly saturated to the degree required in journal box service with the result that the waste will be in a somewhat semi-oiled state and not sufficiently oiled to properly lubricate the journal appearing in the journal box wherein the waste is to be packed.

Therefore it is a primary purpose of the present invention to incorporate along with the device above described of reclaiming the used waste of a method wherein the new waste is started to be soaked in oil at the same time that the used waste is being washed in the initial stage of its reclamation, and then the new waste is caused to move along in timed relation with the overall travel of the waste being reclaimed from the initial washing stage to the final reoiled and cleaned stage ready for reuse. At the same time, the method and the device contemplates the proportioning of the adding of the new waste to the reclaimed waste within very definite and controlled amounts so that the final product comes out as a mixture of reclaimed waste and properly saturated new waste.

This proportioning of new waste to old waste has a rather wide range in that it may run anywhere from ten percent to fifty percent of new waste going in to the reclaimed or renovated waste or packing as it is generally termed.

Other objects and advantages of the invention will become apparent to those versed in the art in the following description of the invention as illustrated in the accompanying drawings, in which—

Fig. 1 is a fragmentary top plan view of a new waste saturating device and conveyor;

Fig. 2 is a view in vertical section on the line 2—2 in Fig. 2, on an enlarged scale;

Fig. 3 is a diagrammatic showing of the relationship of the waste saturating and conveying device with the waste reclaiming or renovating apparatus;

Fig. 4 is a view in longitudinal section on the line 4—4 in Fig. 1;

Fig. 5 is a view in vertical section on the line 5—5 in Fig. 1; and

Fig. 6 is a view in vertical elevation of the delivery end of the waste saturating and conveying device, with portions broken away.

Referring first to Fig. 3 the present invention in combined with the structures of the prior art such as are shown in the Patent Nos. 2,050,415; 2,000,291; and 2,090,260. In Fig. 3, there is illustrated diagrammatically a feed table 10 onto which the waste which has been taken from the journal boxes is brought in and dumped and spread apart, generally by hand operation, to have the major foreign particles removed, and then from this table 10, the old waste is fed in to a device 11 which follows very closely the structure as illustrated in the Patent 2,050,415. The primary structure of this element 11 incorporates a tank of heated lubricating oil having a grid disposed therein over which the waste is moved, the oil being sufficiently hot in this tank to cause the water carried by the waste to be evaporated. Also in this element 11, the waste is simultaneously being heated to reduce the viscosity of the old, used, and congealed oils and greases.

From the dehydrating element 11, the waste is automatically fed into the element 12, which follows very closely the structure illustrated in Figs. 1 and 2 of the Patent No. 2,090,260, primarily in respect to the left hand portions thereof, in which element 12 there is a grid submerged in heated used waste again, and the waste is agitated back and forth in this heated oil and gently separated into more or less individual fibers to have the heated oil serve as a washing medium to swish through the fibers and allow the dirt to become floated off into the oil, with the heavier dirt and foreign particles together with short or tag ends of the waste tending to settle down through the grid in this element away from the usable waste.

From the washing element 12, the washed waste is automatically carried into a press 13, as best illustrated in Fig. 6 of the Patent No. 2,090,260, in which press, the oil in the waste is to a large degree pressed out of the waste so that only the oil actually incorporated in the waste fibers and appearing as a film therearound is retained by the waste as it comes from the press. The press discharges the waste onto a table or preferably into some sort of a waste shaking device 14, the details of which do not form any part of the invention herein described. In any event, whether the operation be performed by hand or by machine, the waste is fluffed up into a separated-fiber condition and is then carried into a tank of heated lubricating oil to be reoiled to the desired percentage of oil. This reoiler element 15 follows largely the construction of the right hand part of the unit as shown in Figs. 1 and 2 of the Patent No. 2,090,260 wherein the waste is agitated in the heated, clean journal box oil and gradually moved along through the tank to be discharged finally into the drum receptacle 16 which is generally mounted on a scale platform 17 for weighing purposes.

The apparatus so far described does not make any provision for the addition of new waste.

One particular device for performing the method of saturating with oil the new waste and adding it to the renovated waste in definite proportions is embodied in the device generally designated by the numeral 20, Fig. 3, and in detail in the other views of the drawings.

This unit 20 is mounted along the side of the waste renovating elements previously described so that there is a new waste receiving hopper 21, and a new waste discharge chute 22 conducting the newly saturated, new waste into the renovated waste reoiler 15. The hopper 21 is located to be adjacent the initial tank 11 wherein the used waste is dumped to be heated and dehydrated. In other words, the hopper 21 is located adjacent the feeding end of the waste renovating apparatus.

From the hopper 21, there leads an elongated oil tank 23, on each side of which there are provided 13 heating pipes 24 and 25. The relatively forward end of the tank 23 inclines upwardly by a length 26 to lead to the desired elevation from which the chute 22 may extend for gravity discharge from the extreme forward end of the inclined portion 26 into the reoiling tank 15.

A driving shaft 27 is mounted transversely across the upper forward end of the inclined delivery end 26 of the tank 23. In the form herein shown, this shaft 27 has fixed thereto a pair of chain sprockets 28 and 29. An idler shaft 30 is mounted to extend transversely across the end of the tank 23 adjacent the hopper 21, Fig. 4. On this shaft 30 there are fixed two spaced apart sprockets 31 and 32, the spacing therebetween being equal to that of the spacing apart of the sprockets 28 and 29 on the shaft 27.

Chains 33 and 34 are carried respectively around the sprockets 28, 31 and the sprockets 29, 32. An intermediate shaft 35 is mounted at the forward end of the tank 23 at the juncture of the inclined portion 26 with the tank 23, Fig. 4. On this shaft 35 there are mounted the sprockets 36 and 37, under which respectively extend the chains 33 and 34, the functioning of these sprockets 36 and 37 being to retain lengths of the chains 33 and 34 in horizontally disposed relation across the longitudinal length of the tank 23.

Plates 38 are secured to the chains 33 and 34 to extend transversely thereacross and by the ends of the plates therebeyond on each respective side. These plates 38 are spaced along the chains at regular intervals. Each plate 38 carries a plurality of fingers 39, three to each plate in the present showing. These fingers 39 are in each instance sloped rearwardly in reference to the direction of travel of the chains 36 and 37 as best shown in Fig. 4. The travel of the chains is indicated by the arrows on the various sprockets 28, 36, and 31 in Fig. 4. That is, the chains 33 and 34 travelling on the under sides of the various sprockets are traveling from the hopper 21 toward the discharge end of the inclined section 26.

During the travel of these two chains 33 and 34, the plates 38 are successively brought around the rear side of the sprockets 31 and 32 to be carried under opposingly directed legs 40 and 41 extending from the side walls of the tank 23 and continuing throughout the lengths of the tank 23 and the inclined section 26. The rear end of the legs 40 and 41 are upturned as at 42, Fig. 4, so that the plates 38 are initially brought around under those upturned ends 42. Spaced below the legs 40 and 41 are corresponding legs 43 and 44 so that the under sides of the plates 38 may rest therealong as they travel particularly between the sprockets 31, 36 and then the sprockets 36, 28. Therefore it is to be seen that the chains 33 and 34 in traveling throughout the longitudinal length of the tank 23 are maintained in substantially horizontally disposed conditions so that the lower ends of the fingers 39 are spaced a constant distance above the floor 45 of the tank 23.

Referring to the discharge end of the section 26, this end 26 communicates with the vertically disposed chute 46. This chute 46 is open across its under side and discharges into a final conveyor chute 22. This chute 22 is given a sufficient length to convey the waste into the unit 15 at the proper and desired location thereover. To aid in the movement of the waste after it is dropped from the chute 46 into the final chute 22, this chute 22 is agitated in some suitable manner, such as in a vertically disposed manner. In the present showing, the upper end of the chute 22 is hinged to the upper end of its lower floor side on a supporting frame 47 by a bolt 48. An angle iron 49 straddles the chute 22 and is secured by downturned legs 50 and 51 to the side walls of the chute 22. A connecting rod 53 is secured by its lower end to the angle bar 49 which extends upwardly to be rockably attached to the rocker arm 54 which is pivoted to the frame 47 by a bolt 55. The rocker arm 54 carries a roller 56 which rests upon a cam 57 in turn fixed to the shaft 27 outside of the chute 46, Figs. 5 and 6. Thus, upon rotation of the shaft 27, the cam 57 revolves and reciprocates vertically the connecting rod 53 and in turn the chute 22.

All of the units 11, 12, 13, and 15 are driven in a predetermined timed sequence, and in the driving mechanism thereof, there is, for example, a shaft 59 of the unit 15 which is a part of the timed driven mechanism. Advantage is taken of the presence of the shaft 59 by placing a sprocket 60 thereon, and through a chain 61 engaging the sprocket 60, the shaft 27 is driven by this chain 61 in carrying the chain 61 around a sprocket 62 fixed on the shaft 27. By that means, the unit 20 is driven in timed sequence with the operation of the units 11—15.

Oil is carried by the tank 23 and heated by the steam coils 24 and 25, to the predetermined temperature. The oil level is maintained in the tank 23 by any suitable means, herein shown as by a float mechanism (not shown) embodied within an external float chamber 63.

*Operation*

The waste to be renovated is fed from the feed table 10 into the unit 11. Simultaneously new waste in a dry state (never before oiled) is fed into the hopper 21. The hopper 21, for example in one particular size of construction, has a top opening of about eight by ten inches. Then there is a shield 64 fixed in position above and around behind the sprockets 31 and 32 so that the fingers 39 are carried around under the shield 64. The lower edge 65 of the shield 64 is carried down within the hopper 21 for a distance of at least about six inches. This shield 64 is not only provided to protect the operator, but also has a definite function in that the waste put into the hopper 21 cannot become impaled on the fingers 39 until those fingers have come around under the sprockets 31 and 32 into their rearwardly inclined position so that the fingers in effect come in behind the waste to push it along through the tank 23 rather than have the ends of those fingers come down and penetrate the waste. The size of the hopper 21 in respect to its effective opening area is such that it serves as a limiting factor only in the sizes of pieces of waste being fed into the saturating unit 20.

The length of the unit 20 and the speed of travel of the chains 33 and 34 have a close correlation with the speed of operation and size of the various units 11—15. As above indicated, the chains 33 and 34 are driven in timed sequence with the operation of those units 11—15. There must be sufficient time given the new waste for complete saturation with oil as it is slowly carried through the tank 23 and up the discharging inclined portion 26. This is one reason why the unit 20 is given the overall length of approximately the combined lengths of the units 11—15. In so doing, the cross section of the tank 23 may be held to a minimum. With any given size of section of the tank 23, variations in proportions of the newly saturated waste with the renovated waste are achieved by varying the rate of travel of the chains 33 and 34. This, of course, may be obtained by varying the ratio of speeds of the shaft 27 in relation to the shaft 59 which serves as the driving shaft in the present showing.

Thus the speed of the chains 33 and 34 may be varied so that the resultant conveying action would deliver the saturated waste from proportions ranging for example from ten per cent to fifty per cent of new waste in respect to the renovated waste.

Then to incorporate this oil saturated, new waste, with the renovated waste in the desired proportions, it is carried into and dumped from the chute 22 into the renovated waste reoiling tank 15. In that device, utilizing the old structure, the new waste is very thoroughly intermixed with the renovated waste and the combined new and old waste is finally discharged into the receiving drum 16 as above indicated.

Thus it is to be seen that along in conjunction with the renovating of the old, used waste, the saturation of new waste to be added thereto is carried on, and in a very definite, timed sequence, in order to introduce the newly saturated waste, that is, the oil saturated new waste, into the renovated waste in definite proportions, all in an automatic manner following the initial feeding of the two different types of waste into their respective receiving instruments.

Therefore while I have described my invention in the one particular form, it is obvious that structural changes may be employed without departing from the spirit of the invention, and I therefore do not desire to be limited to that precise structure, except by limitations as may be imposed by the following claims.

I claim:

1. Apparatus for producing journal box packing out of journal box used and new waste which comprises the combination with mechanism for automatically moving the used journal box waste through a wash bath of hot lubricating oil into and out of a bath of hot lubricating oil for waste reoiling, of a device for receiving new waste; a hot oil tank; conveying means for moving the new waste from said device through the hot oil tank and discharging the new waste from the hot oil tank into said reoiling bath; and means driving said conveyor in relation to the time of said mechanism carrying said used waste through said reoiling bath, whereby a definite percentage of new to used waste is maintained.

2. Apparatus for producing journal box packing out of journal box used and new waste which comprises the combination with mechanism for automatically moving the used journal box waste through a wash bath of hot lubricating oil into and out of a bath of hot lubricating oil for waste reoiling, of a device for receiving new waste; a hot oil tank; conveying means for moving the new waste from said device through the hot oil tank and discharging the new waste from the hot oil tank into said reoiling bath; and means driving said conveyor in relation to the time of said mechanism carrying said used waste through said reoiling bath, whereby a definite percentage of new to used waste is maintained; and means for draining excess oil from said new waste prior to its discharge into said used waste reoiling hot oil tank.

References Cited in the file of this patent
UNITED STATES PATENTS

| Number | Name | Date |
| --- | --- | --- |
| 1,051,116 | Jones | Jan. 21, 1913 |
| 1,186,042 | Sargent | June 6, 1916 |
| 1,346,828 | Kido | July 20, 1920 |
| 1,483,361 | McCarthy | Feb. 12, 1924 |
| 1,676,713 | Simmen | July 10, 1928 |
| 1,771,848 | Hiatt | July 29, 1930 |
| 1,779,104 | Pearce | Oct. 21, 1930 |
| 2,000,291 | McNamara | May 7, 1935 |
| 2,050,415 | Bissell | Aug. 11, 1936 |
| 2,090,260 | McNamara | Aug. 17, 1937 |
| 2,267,894 | Booth | Dec. 30, 1941 |
| 2,321,397 | Koch | June 8, 1943 |
| 2,348,597 | Booth | May 9, 1944 |
| 2,405,391 | Anderson | Aug. 6, 1946 |

OTHER REFERENCES

"Railway Review" publication, issue of Dec. 29, 1923, pages 931 to 935. (Copy in Div. 29, class 68—1.)